United States Patent [19]

Commarmot et al.

[11] Patent Number: 4,681,740
[45] Date of Patent: Jul. 21, 1987

[54] APPARATUS FOR THE CHEMICAL REACTION BY WET PROCESS OF VARIOUS PRODUCTS

[75] Inventors: Roger Commarmot, Lyons; Dominique Didenot, Meyzieu; Jean-François Gardais, Chuzelles, all of France

[73] Assignee: Societe Prolabo, Paris, France

[21] Appl. No.: 706,339

[22] Filed: Feb. 27, 1985

[30] Foreign Application Priority Data

Mar. 2, 1984 [FR] France .................................. 84 03496

[51] Int. Cl.$^4$ ............................................. G01N 31/16
[52] U.S. Cl. .................... 422/78; 219/10.55 R; 219/10.55 A; 219/10.55 D; 250/455.1; 422/63; 422/65; 422/130; 422/186
[58] Field of Search ........................ 422/63, 64, 67, 68, 422/78, 79, 80, 8, 186, 22; 250/455.1; 219/10.55 R, 10.55 A, 10.55 D; 34/1

[56] References Cited

U.S. PATENT DOCUMENTS

| 2,868,626 | 1/1969 | Allen | 422/68 |
| 3,694,157 | 9/1972 | Koch et al. | 422/68 |
| 3,745,292 | 7/1973 | Couasnard |  |
| 4,242,301 | 12/1980 | Heyneman et al. | 422/68 |
| 4,347,216 | 8/1982 | Kawasaki et al. | 422/68 |

FOREIGN PATENT DOCUMENTS 2122859 1/1984 United Kingdom .

Primary Examiner—Michael S. Marcus
Attorney, Agent, or Firm—Bacon & Thomas

[57] ABSTRACT

The present invention relates to an apparatus for the chemical reaction of compounds, wherein said apparatus comprises: sample container means having an enlarged sample containing portion at a lower end thereof and an upwardly extending neck portion, a housing defining a microwave heating chamber having an upper wall and defining in said upper wall an opening and a stack bordering said opening and rising to a height forming an absorption barrier to micro-waves. The invention is more particularly applicable to a reaction of mineralization.

7 Claims, 5 Drawing Figures

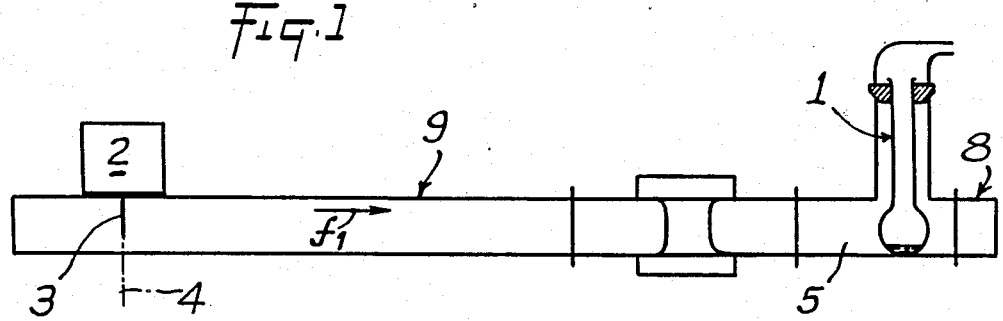
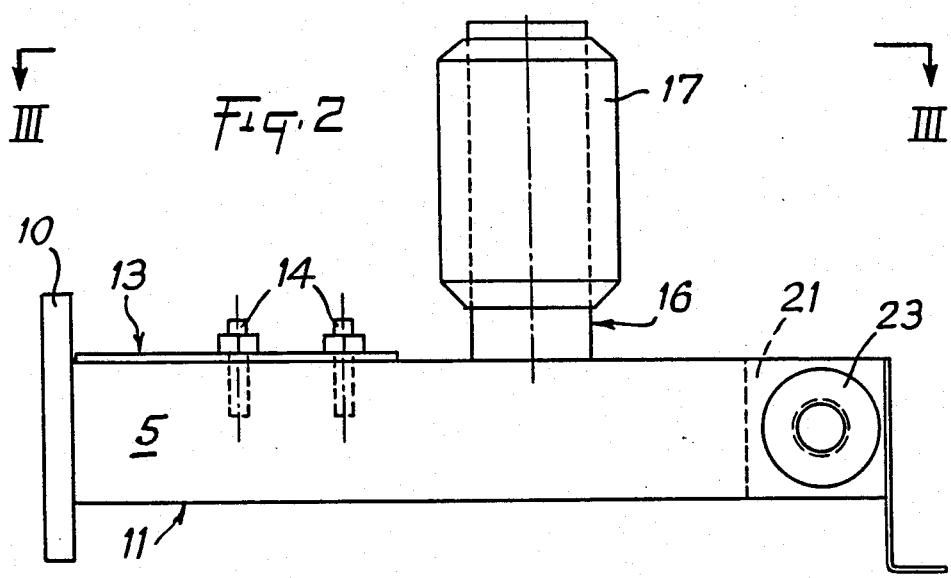
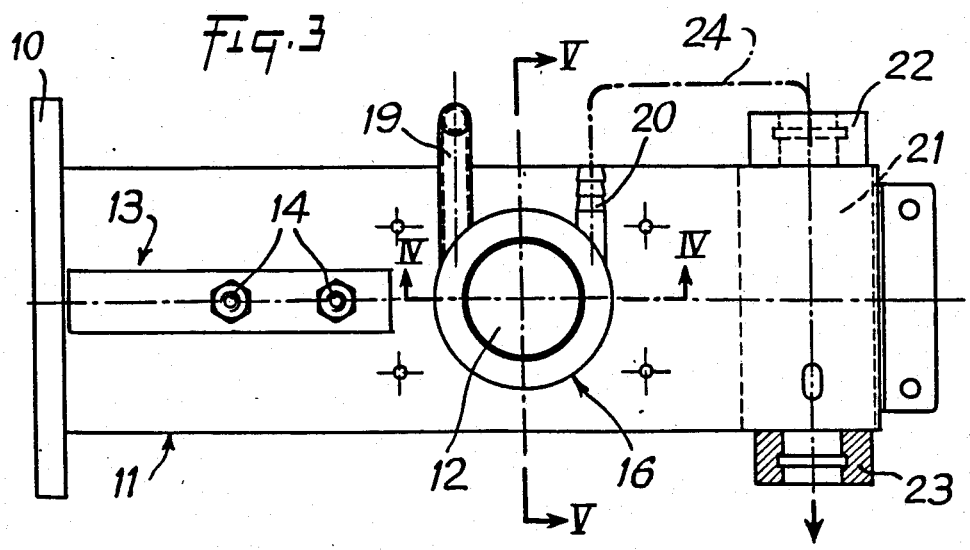

APPARATUS FOR THE CHEMICAL REACTION BY WET PROCESS OF VARIOUS PRODUCTS

The present invention relates to the technical domain of the chemical reaction of inorganic, organic or organometallic compounds.

It is known that it is necessary, before the majority of compound analysis treatments, to proceed with a chemical reaction, for example a mineralization by wet process by means of concentrated acids, such as sulfuric acid, nitric acid, perchloric acid, or mixtures of these acids, or a saponification by alcoholic potash, an oxidation or a reduction.

In order to carry out such a prior analysis treatment, a conventional method consists of disposing in a container, for example of the flask type, a dose of compound to be analyzed, as well as the necessary complementary volume of specific concentrated reagent.

The container is then heated and permanently watched by an operator whose job is to regulate periodically the calories transmitted to the container in order to avoid foaming and overflow of the product. The operator must also periodically but frequently stir the mixture subjected to heating, in order to maintain a good homogeneity of the dissolved and heated compound.

Such operator attention is long, fastidious and likely to lead to physical accidents, sometimes serious for the operator, by the risks of explosion, projections of the composition and by the emanation of corrosive fumes and vapours.

In addition to the drawbacks mentioned above, it should be noted that the method thus applied does not make it possible to monitor effectively the possible departure of fractions of the products included in the basic composition and entrained by the fumes and vapours which escape from the neck of the container. It follows that the subsequent result of analysis is considerably disturbed without a means of control for assessing the existence and importance of this random negative factor.

In an attempt to perfect such a process, different propositions of improvement have been developed and carried out.

For example, installations have been proposed which employ, as heating means, instead of a direct flame, a bank of crucibles with infra-red radiation of which the power of each may be regulated by acting on its own electrical supply. Such a bank of crucibles is associated with a fume collector common to all the crucibles and connected to a pumping unit.

Although such modifications have brought a certain improvement, they do not solve the problems of permanent surveillance, stirring and uncertainty of the results obtained, as these three factors are always a function of the permanent attention of one or more operators.

Furthermore, the operation of such an installation requires a certain know-how. In fact, regulation of the heating power of each crucible must be assessed as a function of the thermal inertia of such an apparatus and consequently requires considerable experience to assess the anticipation factor to be retained for the increase, but also for the reduction, in the temperature imposed on a sample.

Still with a view to improving such a process for prior analysis treatment, it has been proposed to use, as heat generator, a micro-wave oven provided with a fume and vapour suction part.

U.S. Pat. No. 4 080 168 teaches such a proposition and recommends the use of a micro-wave oven in the cavity of which is placed a flask containing the sample to be treated.

This technique presents certain advantages, as the application of micro-waves allows a quasi-uniform distribution of the energy and therefore a thorough heating of the compound to be treated. For the same reasons, such a technique makes it possible to break the foams which develop with the preceding technique when the temperature of the compound rises. A permanent surveillance of the development of the treatment is therefore theoretically no longer necessary and thus relieves an operator of this fastidious and dangerous aspect of the prior known method.

In addition, a micro-wave oven is known for its lack of thermal inertia, which makes it possible to regulate more precisely the energy transmitted to the sample.

However, it has been observed that such an apparatus was not entirely satisfactory. In fact, it has been observed that a certain number of products could not be treated, by reason, in particular, of the rapid ebullition of the added reagent.

In other cases, it has been observed that the process of mineralization could not be carried out without the frequent intervention of an operator, as in the case of heating by conventional burner rail, due to the fact that such an oven does not enable the energy applied to be monitored precisely. In that case, such a technique suffers the same drawbacks of those mentioned hereinabove.

Furthermore, it has also been observed that the results of subsequent analysis were not always precise and there was a factor of uncertainty which was appreciable for certain products. More precisely, a loss of certain products was ascertained, such loss due to an entrainment of fractions of these products by the considerable amount of fumes and vapours, by selective evaporation and/or by priming effect.

By reason of the strong vaporization, a considerable pollution of the microwave heating chamber has also been observed, requiring cleaning of the walls of this chamber after each reaction and before proceeding with the subsequent treatment of a sample of the same nature or not.

Furthermore, the strong evaporation of the or each reagent poses a practical problem which is difficult to solve. In the most frequent case of the operator necessarily having to intervene in order to periodically extract and replace the sample in the microwave heating chamber, gripping of the container must not pose any problem. Now, by reason of the strong evaporation, the outer face of the wall of the container is covered with a layer of droplets which risk having serious consequences on the environment when the reagent used is an acid, as in the case of mineralization or of oxidation.

Another negative result of the strong evaporation is that a vapour fog is developed inside the chamber where the container is placed, preventing any visual assessment of the evolution of the reaction underway.

The embodiment of the technique recommended by the U.S. Patent can therefore not be envisaged in practice in the industrial domain. This has, moreover, been realized for some years since the publication by Barrett, Davidowski, Penaro, Copeland, Anal. Chem. 1978-50, 1021 shows an improved technique derived from the teaching of this U.S. Patent with a view to reducing, but not eliminating the drawbacks following from the strong vaporizaton.

It is an object of the present invention to provide a novel apparatus for chemical reaction by wet process, still employing microwaves, but in which the particular structure enables the drawbacks of the present methods and, more precisely, those of the technique according to U.S. Pat. No. 4 080 168, to be eliminated.

Moreover, the structural features of the apparatus according to the invention also enable surprizing results to be obtained in the treatment of mineralization of certain products.

The apparatus for chemical reaction by wet process according to the invention is characterized in that it comprises:
sample container means having an enlarged sample containing portion at a lower end thereof and an upwardly extending neck portion,
a housing defining a microwave heating chamber having an upper wall and defining in said upper wall an opening, and
a stack bordering the opening and rising to a height in order to form an absorption barrier opposing the propagation of micro-waves outside the chamber.

The invention will be more readily understood on reading the following description with reference to the accompanying drawings, in which:

FIG. 1 is a schematic view illustrating an apparatus applying the means of the invention.

FIG. 2 is a longitudinal elevation of one of the constituent elements of the invention.

FIG. 3 is a plan view taken along line III—III of FIG. 2.

Figure 4:
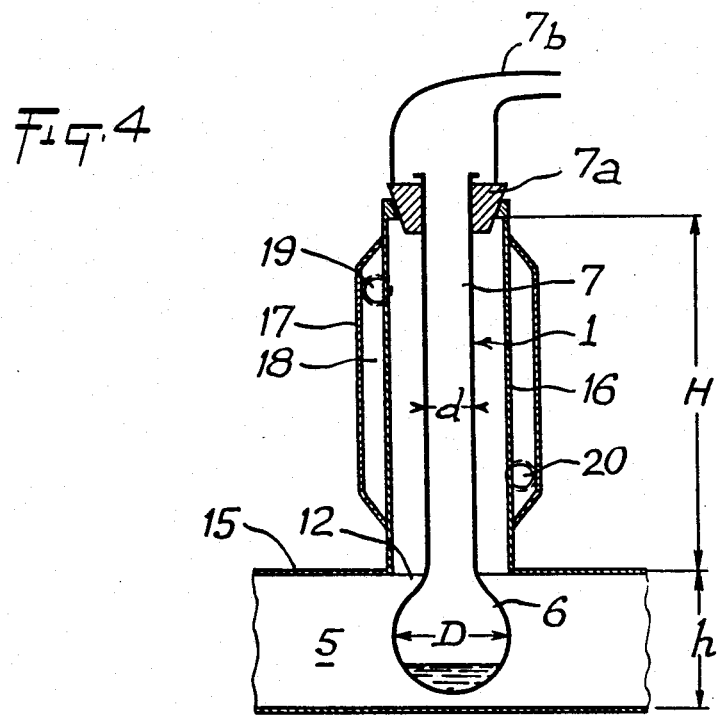
FIG. 4 and FIG. 5 are elevation-sections taken respectively along lines IV—IV and V—V of FIG. 3.

Referring now to the drawings, FIG. 1 schematically shows an apparatus for subjecting to a chemical reaction by wet process a compound disposed in a recipient 1 in which at least one specific reagent is also introduced.

The apparatus comprises a micro-wave generator 2 comprising an antenna 3 emitting micro-waves from a plane of emission 4 into a cavity of application 5 in which the recipient 1 is to be placed.

According to the invention, the sample container 1, as shown in FIG. 4, is made of glass and comprises, at its base, a container portion 6 for retention in at least semi-spherical form and extended by a neck 7 of considerable length, of constant cylindrical section. The sample container 1 is preferably shaped so that the container portion 6 is substantially spherical, in the form of a bulb for example, whose diameter D, taken perpendicularly to the axis of the neck 7, is greater than that d of the latter. The sample container 1 may also be made for example of polycarbonate and present a different form, as a function of the nature of the compound and the chemical reaction to which it is to be subjected. For example, the sample container 1 may be cylindrical with flat or semi-spherical bottom.

The chamber 5 is, in the present case, constituted by the terminal segment 8 of a wave guide 9. The segment 8 comprises technical means usually employed for ensuring and improving the guiding and propagation of the micro-waves emitted by the antenna 3 in a general direction of propagation (arrow $f_1$). The segment 8, as illustrated in FIGS. 2 to 5, presents, from a connecting flange 10, a constant section substantially equivalent to that of the guide 9. The segment 8 is for example constituted by a parallelepipedic envelope 11 made of stainless steel or brass. The envelope 11 comprises, in its upper horizontal wall, a permanently open circular opening 12 whose diameter is equal, to within the clearance, to the diameter D of the container portion 6 of the sample container 1. The circular opening 12 is located at a determined distance from the plane of emission 4, so that its vertical axis corresponds substantially to a zone of formation of an antinode by the waves emitted by the antenna 3 and propagating in the direction of arrow $f_1$. In order to ensure this correspondence, the envelope 11 is provided with a tuning device 13 placed between the flange 10 and the opening 12. The tuning device 13 is preferably constituted by two metal rods 14 adjustably borne by the upper wall 15 of the segment 8 to extend in a direction perpendicular to the longitudinal axis of the envelope 11 inside the latter, both being placed on the longitudinal axis of the segment.

Figure 5:
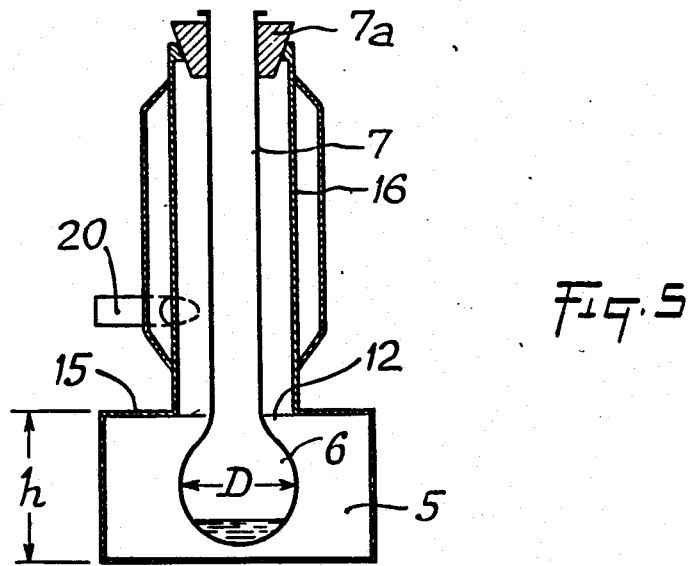

FIGS. 4 and 5 show an important constructive feature of the invention, whereby the chamber 5 presents, at least plumb with the opening 12, a height h corresponding substantially by excess to the diameter D. In this way, only the container portion 6 of the sample container may be disposed inside the cavity 5 by being introduced through opening 12, whilst the neck 7 rises above the wall 15.

The opening 12 is bordered by a tubular stack 16 of cylindrical form, of constant section. The stack 16 rises over a height H chosen as a function of the section of the opening 12 and of the frequency of emission of the micro-waves, so as to constitute an absorption barrier preventing the propagation of these micro-waves outside the chamber 5. In any case, it is provided to make the sample container 1 so that the neck 7 presents a length greater than dimension H. This excess measurement is provided for the adaptation of a stopper 7a or the like for suspension and centering of the sample container with respect to the stack 16. This makes it possible for the axis of the recipient and the axis of the stack to merge and thus to place the container portion 6 precisely in coincidence with the theoretical position of the antinode of the wave having to develop at the level of the opening 12. The stopper 7a also serves as seat for supporting a hood or cover 7b connected to a fume and vapour pumping unit.

The stack 16 is surrounded by a sleeve 17 defining an annular chamber 18. The sleeve 17 comprises two tubes 19 and 20 for connection to a circuit for the circulation of an appropriate fluid, making it possible to regulate the temperature of the stack and consequently that of the neck 7 as a function of the chemical reaction to be carried out. The temperature regulating fluid is for example water.

The end of the envelope 11 opposite flange 10 with respect to the stack 7 is preferably occupied by a water-trap chamber 21. This chamber is in relation with two connections 22 and 23 connected to the lateral faces of the envelope 11 for connection with a water circulation circuit. According to a preferred arrangement of the invention, the connection 22, corresponding to admission, is connected by a pipe 24 to the outlet tube 20 of the annular chamber 18.

The chamber 21 may be replaced by a dry absorber or even possibly eliminated, provided that the rate of stationary waves in the course of application remains admissible by the generator and does not substantially reduce its life duration.

The embodiment of the structural features hereinabove has made it possible to overcome the drawbacks of the heretofore known technical solutions and to obtain surprizing, even unexpected results, when carrying out diverse chemical reactions, by embodying the characteristics set out in figures hereinbelow and employing an apparatus according to the invention.

| | |
|---|---|
| power of the generator | 200 W |
| Frequency of emission | 2.45 GHz |
| Length of envelope 11 from flange 10 | 290 mm |
| Height h of envelope 11 | 47 mm |
| Width of envelope 11 | 90 mm |
| Diameter of opening 12 | 42 mm |
| Distance of opening 12 with respect to flange 10 | 170 mm |
| Height of stack 16 | 121 mm |
| Diameter of stack 16 | 42 mm |
| Diameter D of container portion 6 | 38 mm |
| Diameter d of neck 7 | 22 mm |
| Length of neck 7 | 150 mm |

The following Examples give results obtained with such an apparatus and furnish the results recorded for the same samples of products, with the heretofore known methods.

A—REACTION OF THE MINERALIZATION

EXAMPLE 1

| | |
|---|---|
| Succinimide oil C 5935 manufactured by OROGIL | 200 mg |
| Sulfuric acid | 4 ml |
| Kjeldahl catalyst | 3 g |
| Infra-red burner | 6 hours |
| Micro-wave oven (Type LMI, Model LAB 607 600 W) | Process interrupted by reason of the departure of the sulfuric acid and the obtaining of a carbonaceous mass. Pollution of the oven and of the recipient |
| Invention | 1 hour at 120 W or 18 mins. at 200 W. Absence of pollution |

EXAMPLE 2

| | |
|---|---|
| Monohydrochloride of LYSINE | 50 mg |
| Sulfuric acid | 4 ml |
| Kjeldahl catalyst | 3 g |
| Infra-red burner | >1 hour |
| Micro-wave oven | Stoppage of the reaction after 15 mins. (Heating time + cooling time) as vaporization of $H_2SO_4$. Obtaining of a yellowish solution. N = 15.2%. Pollution of the enclosure. |
| Invention | 28 mins. comprising 2 mins. at 60 W and 26 mins. at 120 W. Limpid and colourless solution. N = 15.2%. Absence of pollution |

EXAMPLE 3

| | |
|---|---|
| PVC No. 140 manufactured by RHONE-POULENC | 210 mg |
| Sulfuric acid | 5 ml |
| Nitric acid | 2 ml |
| Infra-red burner | 16 hours |
| Micro-wave oven | In addition, addition of 10 ml of nitric acid 50 mins. including the exposure time + the handling time + the cooling time. Difficult to carry out due to the power of heating and to the release of nitrous vapours. |
| Invention | In addition, addition of 8 ml of nitric acid 45 mins. including six successive sequences of oxidation at 100 W and of elimination at 120 W In addition, addition of 8 ml of nitric acid. Absence of pollution. |

EXAMPLE 4

| | |
|---|---|
| Phosphonate | 60 mg |
| Sulfuric acid | 3 ml |
| Nitric acid | 0.2 ml |
| Hydrogen peroxide | 0.2 ml |
| Infra-red burner | 4 hours. P = 14.79% |
| Micro-wave oven | 33 mins. P = 15.2% Appearance of a very thick acid fog and pollution. |
| Invention | 40 mins. - 120 W. P = 14.78% Absence of pollution |

EXAMPLE 5

| | |
|---|---|
| Egg protein | 50 mg |
| Sulfuric acid | 4 ml |
| Kjeldahl catalyst | 3 g |
| Infra-red burner | 1 hour. N = 13% |
| Micro-wave oven | Exposure time: 6 mins. 30 secs. Constant surveillance (presence of foams). Clear liquid. N = 13% |
| Invention | 9 mins. at 120 W (initial 80 W) or 6 mins. at 200 W. N = 13%. Absence of foam. No surveillance. |

B—REACTION OF OXIDATION

EXAMPLE 1

| | |
|---|---|
| Hastelloy B | 320 mg |
| Aqua regia | 5 ml |
| Infra-red burner | 1 to several days. Reaction often incomplete. |
| Micro-wave oven | Heating time + cooling = 10 mins. Time end of reaction > 10 mins. Reaction very difficult to monitor (heating time very short) by reason of ebullition of the acid mixture. Losses and pollution |
| Invention | 12 mins. - 55 W Complete attack. Absence of pollution |

EXAMPLE 2

Measurement of the COD (chemical oxygen demand) in accordance with French standard NF 90 101. This standard specifies that the reaction must be carried out at reflux for 2 hours, with the aid of a cooling agent (to avoid losses of volatile oxidizable substances).

| | |
|---|---|
| Urea solution at 1.2 g/l | 1 ml |
| Reagents according to the standard viz. | |
| mercuric sulfate | 100 mg |
| sulfuric acid, $AgNO_3$ | 1 cm$^3$ |
| 0.25 N $K_2Cr_2O_7$ | 3 cm$^3$ |
| Reaction according to the standard | COD = 0 mg/l (Time = 2 hrs). |
| Infra-red burner | COD = 0 mg/l (Time = 2 hrs) |

| | |
|---|---|
| Micro-wave oven | Ebullition of the medium is so rapid (<10 seconds) that it is not possible, despite surveillance, to avoid overflow of the reagents and loss of part of the sample in the oven. In this type of equipment, it is impossible to apply the standard by reason of the impossibility of employing a cooling agent. |
| Invention | COD = 0 mg/l (Time = 15 minutes). Respect of the standard, easy assembly of the cooling agent outside the stack. Absence of overflow by monitoring of the power. |

EXAMPLE 3

| Measurement of the COD | |
|---|---|
| Effluent of the RHONE POULENC ST FONS purification station (rejects 5019) Reagents according to standard, viz. | 0.25 ml |
| mercuric sulfate | 100 mg |
| sulfuric acid, AgNO$_3$ | 1 cm$^3$ |
| 0.25 N K$_2$Cr$_2$O$_7$ | 3 cm$^3$ |
| Reaction according to standard | COD = 4500 mg/l (Time = 2 hrs.) |
| Infra-red burner | COD = 4500 mg/l (Time = 2 hrs.) |
| Micro-wave oven | Ebullition of the medium is so rapid (<10 seconds) that it is not possible, despite surveillance, to avoid overflow of the reagents and loss of part of the sample in the oven. In this type of equipment, it is impossible to apply the standard to the impossibility of employing a cooling agent. |
| Invention | COD = 4550 mg/l (Time = 15 minutes). Power applied = 100 W. The result is identical after 2 hours. Respect of the standard, easy assembly of the cooling agent outside the stack. Absence of overflow by monitoring of the power. |

C—REACTION OF SAPONIFICATION AND/OR HYDROLYSIS

Determination of the hydrolyzable chlorine in chlorinated compounds (at reflux) in accordance with U.S. standard ASTM D 2441-68

EXAMPLE 1

| | |
|---|---|
| 1,1,1, Trichloroethane marketed under trademark "FLUKA" | 48 mg |
| 1,1 M methanolic soda | 10 ml |
| Reaction according to ASTM standard (heating plate or burner) | Cl = 0.30% (1 hour) |
| Micro-wave oven | Difference with the standard: no cooling agent can be installed. After less than 10 seconds of exposure, a mini-explosion is observed in the flask with almost total losses. Absence of measurements. |
| Invention (in accordance with standard) | Cl = 0.38% 8 minutes and Power applied = 40 W |

EXAMPLE 2

| | |
|---|---|
| Mixture of 1,2,3 and 1,2,4 trichlobenzene RP TRI-A No. EC 80-2 | 4 g |
| 0.1 M methanolic soda | 10 ml |
| Reaction according to ASTM standard (heating plate or burner) | Cl = 5 ppm —1 hour) |
| Micro-wave oven | Difference with the standard: no cooling agent can be installed. After less than 10 seconds of exposure, a mini-explosion is observed in the flask with almost total losses. Absence of measurement. |
| Invention in accordance with standard) | Cl = 3 ppm 80 W - 8 minutes Identical result 80 W - 60 mins. time of the standard |

A comparison of the above results shows that the embodiment of the structural characteristics of the apparatus according to the invention ensures:
- a total absence of pollution of the equipment according to the invention,
- a clean process allowing manipulations without particular precautions
- a possibility of treatment of products which, up to the present time, could be treated only with a particularly long reaction time, in accordance with the conventional technique, or could not be treated with the technique according to U.S. Pat. No. 4 080 168.
- an appreciable, even considerable saving of treatment time with respect to the conventional method.
- a considerable saving of power and consequently of energy consumption with respect to conventional techniques.
- a possibility of operating to reflux in accordance with the requirements of national or international standards.

Another advantage of the object of the invention resides in the fact that the presence of the annular chamber 17 makes it possible to modulate and regulate the temperature of the neck 7, despite the rise in temperature of the product placed in the bulb 6. Depending on the type of reaction, this promotes either cooling which is favourable to a condensation of the vapours along the neck 7, or heating of the latter, particularly in the case of phase of mineralization by reduction to ensure evaporation of the reaction products, as in Example A-3. In such a case, communication between chamber 21 and chamber 18 is eliminated, chamber 18 then being placed in relation with a circuit for supplying a fluid whose temperature is regulated as a function of the reaction carried out.

Yet another advantage resides in the fact that the open upper end of the neck is accessible and the equipment specific to the reaction to be carried out may be fitted thereon, such as a cooling column in accordance with Examples B-2 and 3 or Examples C-1 and 2.

The invention is not limited to the example described and shown, as various modifications may be made thereto without departing from its scope.

What is claimed is:

1. An apparatus for wet process chemical reactions comprising (i) a micro-wave generator for emitting micro-waves into a micro-wave heating chamber, (ii) a micro-wave heating chamber adapted to contain a sample of product to be heated to form a composition by association with at least one specific reagent, said micro-wave heating chamber comprising a wave guide into which said micro-wave generator emits, said wave guide having an upper wall and defining in said upper wall an opening and wherein an end of the wave guide, located opposite the micro-wave generator with respect to the opening, is equipped with a water trap chamber, (iii) sample container means having an enlarged sample containing portion at a lower end thereof disposed within said micro-wave heating chamber and an upwardly extending neck portion extending through said opening in said upper wall of such micro-wave heating chamber, and (iv) a stack bordering said opening in said upper wall of said micro-wave heating chamber and rising to a height which is sufficient to form an absorption barrier opposing the propagation of micro-waves outside the micro-wave heating chamber.

2. The apparatus of claim 1, further comprising an annular chamber surrounding the stack which is in communication with a circuit for the circulation of a fluid to regulate the temperature of the neck of the sample container means.

3. The apparatus of claim 1, wherein said sample containing portion of said sample container means is in the form of a substantially spherical bulb.

4. The apparatus of claim 1, wherein the opening in the upper wall of the micro-wave heating chamber is located at a distance from the plane of emission of the micro-wave generator corresponding substantially to a zone of formation of an antinode of the waves emitted.

5. The apparatus of claim 1, wherein the water trap chamber is connected to the outlet of the annular chamber of the stack.

6. The apparatus of claim 1, wherein said neck portion has a length greater than the height of the stack and is provided at its upper end with a stopper for support and centering with respect to the stack.

7. The apparatus of claim 6, wherein the stopper serves as a seat for supporting a cover or hood for aspiration of the vapours and fumes.

* * * * *